Jan. 11, 1938. W. S. SAUNDERS 2,104,773
STORAGE BATTERY INSTALLATION
Filed Aug. 21, 1936 2 Sheets-Sheet 1
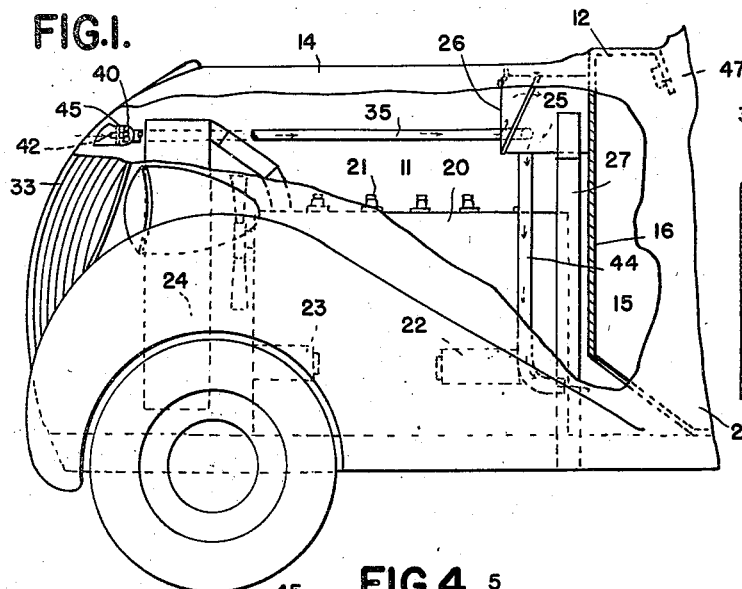
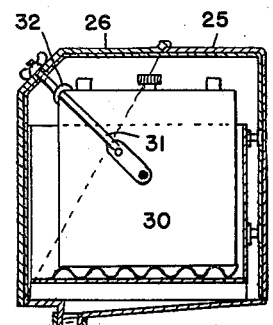
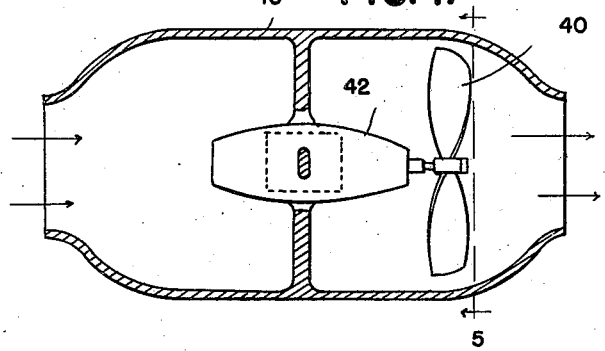
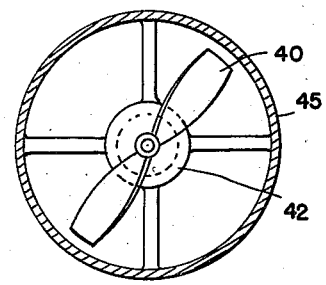
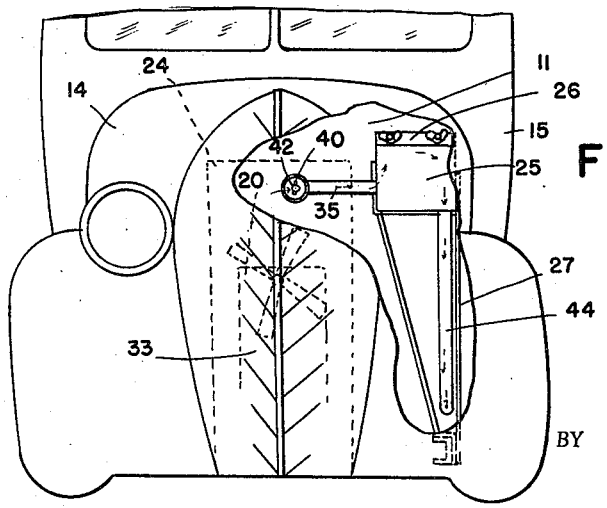
INVENTOR.
WALTER S. SAUNDERS
BY
ATTORNEYS Jan. 11, 1938. W. S. SAUNDERS 2,104,773
STORAGE BATTERY INSTALLATION
Filed Aug. 21, 1936 2 Sheets—Sheet 2
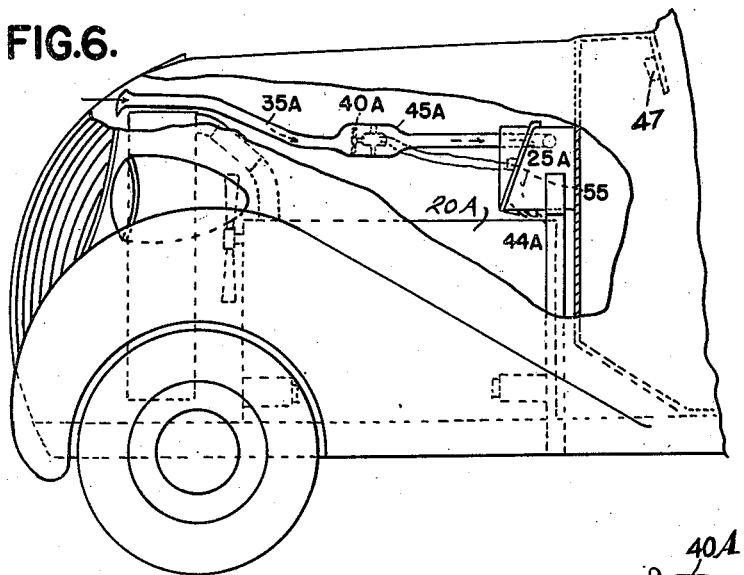
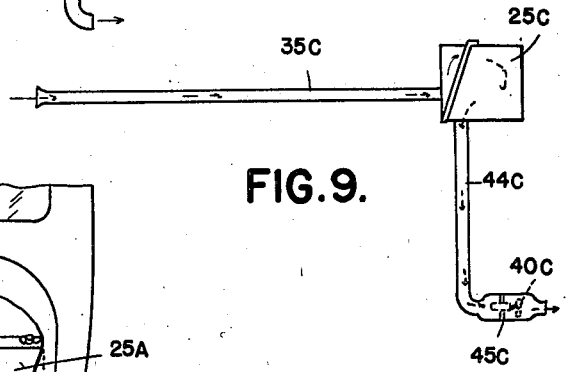
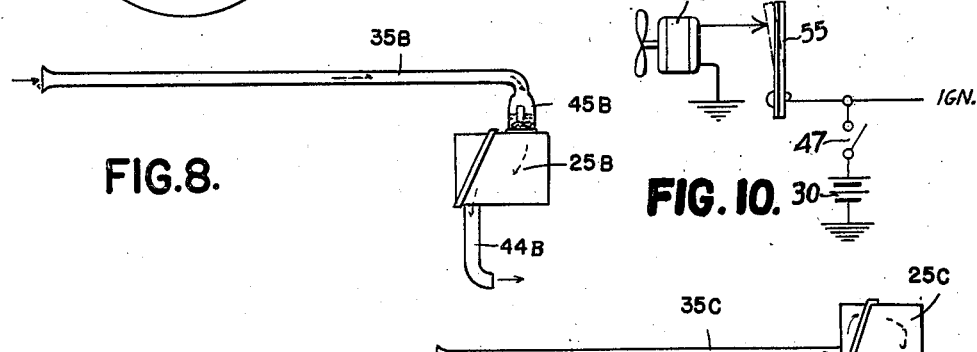
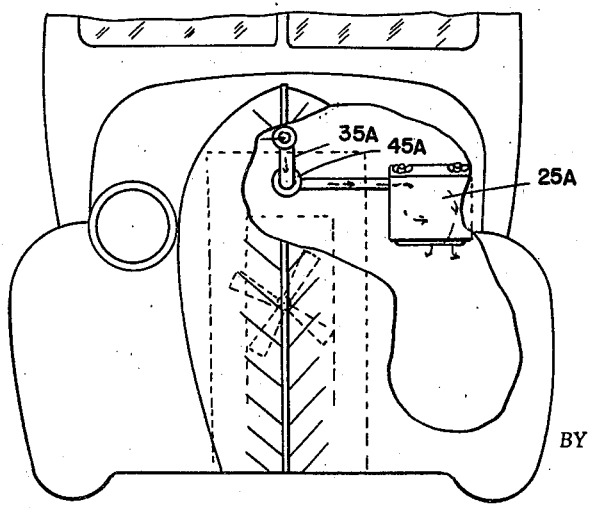
INVENTOR.
WALTER S. SAUNDERS
BY
ATTORNEYS Patented Jan. 11, 1938

2,104,773

UNITED STATES PATENT OFFICE 2,104,773

STORAGE BATTERY INSTALLATION

Walter S. Saunders, Pontiac, Mich., assignor to The American Forging and Socket Company, Pontiac, Mich., a corporation of Michigan Application August 21, 1936, Serial No. 97,216

6 Claims. (Cl. 180—68.5)

This invention relates to the installation of storage batteries in automotive vehicles, and is particularly concerned with improvement of the inventions disclosed in my copending application Serial No. 64,909 filed February 20, 1936.

An important object of the present invention is to provide simple, inexpensive and fool-proof means whereby the storage battery of a motor car may be mounted in close proximity to the engine, and to the electrical elements appurtenant the same, yet the battery may be protected from the heat of the engine. A related object is to provide improved means for inducing a positive circulation of air through the battery case independently of the operation of the engine and of whether the vehicle be in motion or at rest.

Other objects and advantages will be apparent from the following description, wherein reference is made to the accompanying drawings, illustrating preferred embodiments of my invention, and wherein similar reference numerals designate similar parts throughout the several views.

In the drawings:

Figure 1 is a fragmentary and somewhat diagrammatic side elevational view of the front portion of a motor car equipped with a battery installation incorporating the principles of this invention, parts being broken away to afford a better view of the installation.

Figure 2 is a front elevational view of the same, likewise of fragmentary and diagrammatic character.

Figure 3 is a cross sectional view of the battery case.

Figure 4 is a substantially diametric longitudinal section of the draft fan.

Figure 5 is a cross section thereof taken substantially on the line 5—5 of Figure 4 and looking in the direction of the arrows.

Figure 6 is a view similar to Figure 1 of a somewhat modified construction.

Figure 7 is a front view similar to Figure 2 of the modified construction; and

Figures 8 and 9 are schematic views of somewhat modified arrangements of the draft fan.

Figure 10 is a schematic diagram of a suitable electric circuit for controlling the operation of the battery ventilating motor.

Referring to Figures 1–5 of the drawings, reference character 11 designates the engine compartment of a motor car, the latter generally designated 12. The engine compartment is closed by a hood, 14, and at the rear separated from the passenger compartment 15 by a dash panel 16. The engine 20 incorporates electrically operable elements including the spark plugs 21, starter motor 22 and battery charging means such as the generator 23. Means are provided for mounting the battery directly in the engine compartment, a battery box 25 being secured against the dash panel above the engine, and preferably supported from the frame of the vehicle as by uprights 27. The box is provided with a removable cover 26 which ordinarily tightly closes it, the bolts 31 also carrying the clamping member 32 which acts to rigidly hold in place the storage battery 30. The air inlet tube or hose 35 extends forwardly from the battery box to a position in advance of the motor and the radiator 24 but behind the ornamental grille 33, where it may intercept unheated air.

Arranged in the inlet conduit, and shown in Figure 1 as at the front end thereof, is a fan 40 drivable by an electric motor 42 and adapted to force air into the tube 35 and so induce a positive circulation through the battery box. From the box a discharge tube 44 extends downwardly to a suitable position near the bottom of the engine compartment, where the air is discharged substantially in the direction of the air flow in this area, in a manner adapting such air flow to assist in the withdrawal of air from the box through the discharge tube. The electric fan is mounted in a housing 45 formed as an enlargement of the intake pipe 35, and the electric motor 42 may be connected in series with the battery 30 and the ignition switch, as 47, by which switch the engine 20 is controlled. This arrangement provides for automatically switching on the fan and maintaining it in operation with the engine 20.

In the somewhat modified construction shown in Figure 6 the air is delivered to the battery box 25A near the top by means of an inlet conduit 35A, which is positioned similarly to inlet conduit 35 above described, and in which is incorporated a casing section 45A constituting an enlargement of a portion of the inlet tube and housing the electrically driven draft fan 40A, operable by current from the battery and controlled by a thermostatic switch 55 connected in series therewith and arranged to turn on the fan when the temperature in the battery box rises above a desired point, and to maintain the fan in operation so long as such temperature is exceeded. This may operate regardless of whether or not the engine is in operation, or may be connected in series with the ignition switch as previously described, or otherwise arranged to be operable only when the engine 20A is in operation.

In Figure 8 is diagrammatically illustrated another somewhat modified construction. The casing portion 45B of the draft fan is mounted and carried directly upon the top of the battery box 25B, from which the inlet conduit 35B extends forwardly in similar fashion, while the discharge tube 44B is indicated as extending downwardly from the battery box to a suitable position enabling the air flow about the engine to assist the withdrawal of air from the box.

In Figure 9 is shown a further modification in which the battery box 25C and inlet and outlet conduits 35C—44C are arranged in a manner generally similar to the disposition of these elements in the embodiment first described, except that the draft fan 40C is incorporated in the discharge conduit 44C, in a special casing section 45C disposed near the end thereof.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In combination with an automotive vehicle incorporating electrically operable elements and including a frame, an engine mounted in the frame which develops waste heat during operation, one or more of said electrically operable elements being appurtenant the engine, a storage battery for supplying current to said electrically operable elements, switching means for controlling delivery of such current, and ventilated supporting means for said battery, comprising a battery enclosure located relatively close to the engine and having air inlet and outlet portions, air conducting means connected to the inlet portion and projecting to a position to intercept air unheated by the engine, an electrically operable draft fan connected to one of said portions and adapted to induce circulation of air through the battery enclosure, and automatic temperature-responsive switching means for controlling said fan.

2. Apparatus as set forth in claim 1 in which said first-mentioned switch controls operation of said engine, and said second-mentioned switching means is in series with the first and with the fan to prevent operation of the fan when the first-mentioned switch is turned off.

3. Apparatus as set forth in claim 1 in which the temperature-responsive switching means is responsive to the temperature of the battery enclosure for controlling the operation of said fan.

4. Apparatus as set forth in claim 1 in which said fan is housed in the casing forming part of said air conducting means connected to the inlet portion.

5. Apparatus as set forth in claim 1 in which said fan incorporates a casing carried by the battery enclosure and forming part of said air conducting means.

6. Apparatus as set forth in claim 1 in which said fan includes a casing connected to and forming a section of said discharge portion.

WALTER S. SAUNDERS.